( 12 ) United States Patent
Mazalek et al.

(10) Patent No.: US 7,474,983 B2
(45) Date of Patent: Jan. 6, 2009

(54) METHOD FOR OBJECT IDENTIFICATION AND SENSING IN A BOUNDED INTERACTION SPACE

(75) Inventors: Alexandra Mazalek, Atlanta, GA (US); Glorianna Davenport, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/314,832

(22) Filed: Dec. 21, 2005

(65) Prior Publication Data

US 2006/0149495 A1    Jul. 6, 2006

Related U.S. Application Data

(60) Provisional application No. 60/641,531, filed on Jan. 5, 2005.

(51) Int. Cl.
    *G06F 19/00*    (2006.01)
(52) U.S. Cl. ..................... 702/150; 702/152
(58) Field of Classification Search ............ 702/150, 702/152, 153
See application file for complete search history.

(56) References Cited

U.S. PATENT DOCUMENTS 5,379,269 A * 1/1995 Sindeband et al. .......... 367/127
5,853,327 A * 12/1998 Gilboa ....................... 463/39
6,690,156 B1 * 2/2004 Weiner et al. ........... 324/207.17

* cited by examiner

*Primary Examiner*—John E Barlow, Jr.
*Assistant Examiner*—Douglas N Washburn
(74) *Attorney, Agent, or Firm*—Charles G. Call (57) ABSTRACT

An interactive media table that includes a tabletop that supports of plurality of movable objects each of which is identified by a unique identification code and each of which can be moved from place to place on said tabletop surface by one or more media table users. A display unit produces a visual image on the surface of the tabletop surface and a position tracking system determines the current positions of each of said movable objects by transmitting timed acoustic signals to each movable object, sensing the timing of arrival of these signals using an acoustic pickup on each object, and estimating the location of the object by triangulation. An infrared communications network exchanges timing information, commands and data between the objects and a controller which provides an API to a personal computer which executes an application program that controls the display.

30 Claims, 3 Drawing Sheets

METHOD FOR OBJECT IDENTIFICATION AND SENSING IN A BOUNDED INTERACTION SPACE

CROSS REFERENCE TO RELATED APPLICATIONS

This application is a non-provisional of, and claims the benefit of the filing date of, U.S. Provisional Patent Application Ser. No. 60/641,531 filed on Jan. 5, 2005, the disclosure of which is incorporated herein by reference.

REFERENCE TO COMPUTER PROGRAM LISTING APPENDIX

A computer program listing appendix is stored on each of two duplicate compact disks which accompany this specification. Each disk contains computer program listings which illustrate implementations of the invention. The listings are recorded as ASCII text in IBM PC/MS DOS compatible files which have the names, sizes (in bytes) and creation dates listed below:

Firmware Listing:

| File Name | Bytes | Created |
|---|---|---|
| Master | | |
| 16F877A.txt | 9,988 bytes | 6/24/2004 |
| crc.txt | 8,615 bytes | 12/8/2004 |
| ir.txt | 5,286 bytes | 8/18/2004 |
| main.txt | 8,988 bytes | 8/18/2004 |
| master.txt | 4,279 bytes | 8/5/2004 |
| piezo.txt | 729 bytes | 8/16/2004 |
| serial.txt | 2,103 bytes | 8/16/2004 |
| Puck | | |
| acoustic.txt | 1,542 bytes | 8/13/2004 |
| crc.txt | 8,615 bytes | 12/8/2004 |
| crctab.txt | 8,612 bytes | 8/13/2004 |
| ir.txt | 5,084 bytes | 8/12/2004 |
| master.txt | 3,974 bytes | 8/18/2004 |
| P16F628A.txt | 10,923 bytes | 7/13/2004 |
| puck.txt | 9,033 bytes | 8/17/2004 |
| Serial Buffer | | |
| PIC16F73.txt | 12,813 bytes | 7/13/2004 |
| serial.txt | 5,041 bytes | 12/3/2004 |
| API Software Listing: | | |
| TObject.txt | 3,231 bytes | 8/13/2004 |
| TObjectManager.txt | 8,005 bytes | 8/17/2004 |
| TCalAccessor.txt | 310 bytes | 8/17/2004 |
| TCalibration.txt | 6,844 bytes | 8/17/2004 |
| TEvent.txt | 777 bytes | 8/13/2004 |
| TEventListener.txt | 515 bytes | 8/13/2004 |
| TCRC.txt | 5,552 bytes | 8/12/2004 |
| TPacket.txt | 5,732 bytes | 8/13/2004 |
| TSerial.txt | 4,887 bytes | 8/17/2004 |
| TDispConversion.txt | 899 bytes | 8/17/2004 |
| TEqSubLLS.txt | 6,729 bytes | 8/17/2004 |
| TPosEstimator.txt | 10,977 bytes | 8/17/2004 |
| TPosHistory.txt | 1,097 bytes | 3/3/2005 |
| DataConversion.txt | 5,193 bytes | 8/13/2004 |
| MatrixMath.txt | 4,616 bytes | 8/15/2004 |
| tcal.ini | 251 bytes | 8/13/2004 |
| tconfig.ini | 426 bytes | 8/13/2004 |

FIELD OF THE INVENTION

This invention relates to input/output devices for use with computers and more particularly to a media table capable of detecting the identity and current position of movable objects placed on or near the table surface.

BACKGROUND OF THE INVENTION

Bibliography

In the description that follows, reference will be made to selected publications and other materials by citations in brackets consisting of the name of an author and the year of publication (e.g. [Ullmer 2000]). The corresponding citations for each of these references are listed below:

[Auld 1990] Auld, B. A. (1990). Acoustic Fields and Waves in Solids, Vol. I & II. 2nd Edition, Krieger Publishing Company, February 1990.

[Devige 2003] Devige, F., Nikolovski, J-P. (2003) Accurate Interactive Acoustic Plate. US Patent Application No. US2003/0066692 A1, Apr. 10, 2003.

[Dietz 2001] Dietz, P., Leigh, D. (2001) "DiamondTouch: A Multi-User Touch Technology" in Proceedings of the 14th Annual Symposium on User Interface Software and Technology (UIST '04), ACM Press, pp. 219-226.

[Fitzmaurice 1995] Fitzmaurice, G., Ishii, H., Buxton, W. (1995) "Bricks: Laying the Foundations for Graspable User Interfaces" in Proceedings of Conference on Human Factors in Computing Systems (CHI '95), ACM Press, pp 442-449.

[Grant 2002] Grant, K. D., Winograd, T. (2002) "Flexible, Collaborative Organization on a Tabletop" in CSCW 2002 Workshop on Co-located Tabletop Collaboration: Technologies and Directions. New Orleans, La., USA, November 2002.

[Ing 1998] Ing, R. K., Fink, M. (1998) "Time-Reversed Lamb Waves" in IEEE Transactions on Ultrasonics, Ferroelectrics, and Frequency Control, Vol. 45, No. 4, pp. 1032-1043.

[Jordà 2003] Jordà, S. (2003) "Sonigraphical Instruments: From FMOL to the reacTable*" in Proceedings of the 3rd Conference on New Interfaces for Musical Expression (NIME 03), Montreal, Canada, p. 70-76.

[Kobayashi 1990] Kobayashi, K., Taniisshi, S., Kamono, T., Kaneko, K., Yoshimura, Y., Yanagisawa, R. (1990) Coordinate Input Apparatus. U.S. Pat. No. 4,980,518.

[Omojola 2000] Omojola, O., Post, E. R., Hancher, M. D., Maguire, Y., Pappu, R., Schoner, B., Russo, P. R., Fletcher, R., Gershenfeld, N. (2000) "An Installation of Interactive Furniture" in IBM Systems Journal, Vol. 39, Nos. 3&4, pp. 861-879.

[Paradiso 2002] Paradiso, J., Leo, C. K., Checka, N., Hsiao, K. (2002) "Passive Acoustic Sensing for Tracking Knocks Atop Large Interactive Displays" in Proceedings of the 2002 IEEE International Conference on Sensors, Vol. 1, pp. 521-527.

[Paradiso 2005] Paradiso, J., Leo, C-K. (2005) "Tracking and Characterizing Knocks Atop Large Interactive Displays" in Sensor Review, Vol. 25, No. 2, pp. 134-143.

[Patten 2002] Patten, J., Recht, B., Ishii, H. (2002) "Audiopad: A Tag-based Interface for Musical Performance" in Proceedings of Conference on New Interface for Musical Expression (NIME '02), Dublin, Ireland, 2002.

[Reynolds 2001] Reynolds, M., Schoner, B., Richards, J., Dobson, K., Gershenfeld, N. (2001) "An Immersive, Multi-User, Musical Stage Environment" in Proceedings of SIGGRAPH '01, ACM Press, p. 553-560.

[Roberts 1972] Roberts, L. (1972) "Aloha Packet System With and Without Slots and Capture" in Stanford Research Institute, Advanced Research Projects Agency, Network Information Center, Tech. Rep. ASS Note 8, 1972.

[Rosenfeld 2003] Rosenfeld, D., Perlin, K., Zawadzki, M. (2003) "Planar Manipulator Display" in SIGGRAPH 2003 Emerging Technologies, San Diego, Calif., July 2003.

[Ullmer 2002] Ullmer, B. (2002) Tangible Interfaces for Manipulating Aggregates of Digital Information. Ph.D. Dissertation, Massachusetts Institute of Technology, 2002.

[Underkoffler 1999] Underkoffler, J., Ishii, H. (1999) "Urp: A Luminous-Tangible Workbench for Urban Planning and Design" in Proceedings of Conference on Human Factors in Computing Systems (CHI '99), ACM Press, pp. 386-393.

[Walczak 2003] Walczak, M., McAllister, M., Segen, J., Kennard, P. (2003) "Dialog Table" in Strangely Familiar: Design and Everyday Life exhibition, Walker Art Center, Minneapolis, June 2003.

[Yoshimura 1992] Yoshimura, Y., Tanaka, A., Kaneko, K. (1992). Coordinates Input Apparatus. U.S. Pat. No. 5,097,415.

Media Tables

A media table, occasionally referred to as an interactive workbench within work-related contexts, is a horizontal surface upon which the spatial configuration of tagged objects is computationally interpreted and then augmented with coincident visual output. The visuals are usually provided by rear or front projection. Object tracking provides the ability to identify and associate unique physical artifacts to different elements or functions. In this way, some of the information within the interactive environment can be off-loaded from a purely graphical form to a physical-world representation. This important characteristic of tangible interfaces was noted by Ullmer and Ishii in [Ullmer 2000]. The graspable artifacts of tangible platforms are seen as physically embodying digital information, and they act as both representations and controls within the interactive environment.

Tables provide an ideal space for people to engage in shared and sociable interactions. For media tables, this implies a broad range of physical contexts that would be well-suited for their use, including the home, school classrooms, and conference rooms. One could also imagine placing media tables in public spaces and social environments, such as cafes, shops, or museums. As digital entertainment applications evolve, there is an increasing need to develop a general purpose interactive tabletop display surface that can support a diverse range of applications for these types of spaces, including media asset management, story construction, digital game play, and multimedia learning.

The shared living space found in most homes provides a natural arena for sociable interactions around tables. Media tables in the home may have uses within the domain of arts and entertainment, including specific applications such as game play, storytelling, and media browsing and organization. A media table for the living room needs to provide at least the size and scale of a typical game-board, and should support multiple points of control and multiple applications while ergonomically accommodating several users engaged in sociable interactions from different sides. In particular, a media table for the home might take the form of the low table which is often a living room's center-piece, and serves as a surface for depositing readings materials, playing games, assembling puzzles, sorting photographs and other shared activities. While the need for tabletop display surfaces seems to have been recognized by a number of researchers who have explored various interactive applications on tabletops, none of the early attempts point to a general purpose, economically viable tabletop display and interaction platform. In particular, existing media tables do not provide an extensible architecture that can support a diverse range of applications that would be required for everyday use by many people.

The functional criteria required for a media table can be grouped into the following three categories: (1) object sensing, (2) object management and identification, and (3) table setup and display. Each of these criteria is briefly summarized below.

Object Sensing

While the technologies like GPS capable of tracking objects on a global scale are increasingly accurate and reliable, precisely locating objects on the surface of a table remains a difficult technical problem. A variety of different approaches have been tried, using techniques ranging across optical, acoustic or radio-frequency sensing. It should be noted that many optical or acoustic approaches that are done through the air can pose problems of occlusion if one or more objects are blocking the view of a receiver or transmitter. In these cases, it becomes difficult to support multiple continuously interactive objects. Another problem that often arises is the scalability of the interactive surface in terms of size or shape. Approaches that use antenna grids rather than a small set of fixed receivers or transmitters generally require tiling in order to scale in size which can be costly and generally results in an extra level of complexity in the design of the electronics.

The important considerations for object sensing on an interactive media surface that provides multiple points of control are: the ability to track multiple objects at once, the ability to avoid interference between the tracked objects and between these objects and their surroundings, and the ability to scale the sensing surface to different sizes and aspect ratios.

Object Management & Identification

Interactive tables face the problem of dealing with large numbers of physical objects across many different applications and platforms. While unique identifiers and an extensible namespace are common within the digital realm, getting computers to uniquely identify objects in the physical world is a difficult problem. Technical solutions such as barcodes and Radio Frequency Identification (known as RFID) tags give physical objects a unique identity that can be understood by a computer. This unique identity is retained regardless of where you move the object in the physical space.

On a media table, different interactive objects might have different physical properties or shapes depending on their application and use. For this reason, the objects need to be uniquely and digitally identifiable, and the means of object identification must be able to function together with the table's position sensing technology. Moreover, users might want to move their interactive objects from one table to another, meaning that all tables need to have a shared understanding of how objects are identified and need to provide an application manager that can organize the diverse applications that run on the platform. The system should include an application programming interface (API) to allow programmers to develop different applications for the table and associate them with particular (potentially customized) sets of objects. Finally, if different types of objects are to serve unique purposes within different application environments, an interactive table should ideally provide a means for application designers to customize or tailor interactive objects to their particular applications in terms of physical form or functionality.

Past approaches to interactive tables have not been able to provide adequate systems for object identification and management. Optical-based systems have generally not been able to provide an easily extensible set of interactive objects, and customizations are difficult to manage or scale. Approaches that use actuated RFID tags typically provide only a small set of interactive objects.

The important considerations for object management and identification are: each object should be designated by a unique identifier that can be used across an extensible namespace, each object should be movable from one interactive surface to another and retain its unique identity, and it should be possible for objects to have new capabilities, shapes and forms.

Table Setup & Display

Many of the technical approaches to interactive tables have required a large amount of external infrastructure, such as sensors placed around the room or overhead projection systems to provide a visual display on the table's surface. While these systems work reasonably well for prototyping or demonstration purposes within a research laboratory, they are not viable options for a media table that is designed for use within a home setting. For the latter case, both the sensing and display technologies need to be encased within the interactive table itself. Ideally, the table should be a single integrated unit that is not encumbered by too many wires or external connections (aside from power) and can be easily moved around a typical living room.

The important considerations for table setup and display are: the sensing mechanism should be fully contained within the table, requiring no external infrastructure such as cameras or separate antennas; a display mechanism should be integrated inside the table with the interaction surface, requiring no external infrastructure such as an overhead projector.

Prior Interactive Table Systems

Early work on interactive tables began with the ActiveDesk at the University of Toronto, which allowed two-handed input through physical artifacts called "bricks" and was used with a drawing application called GraspDraw [Fitzmaurice 1995]. The next major steps took place at the MIT Media Lab, with the metaDesk and I/O Bulb projects [Ullmer 1997, Underkoffler 1999]. These systems differed from the ActiveDesk in that they were designed for collaborative use. Applications included geographical visualization, simulation of holographic setups, and urban planning. In both systems, the tracking of multiple objects was achieved through computer vision, and the display was accomplished with projected graphics from the rear (metaDesk) or the front (I/O Bulb).

Since then, interactive tables are being explored by an increasing number of researchers for different applications in a variety of physical contexts. The Sensetable project at the M.I.T. Media Lab has been used for applications in a number of areas, including supply-chain visualization and musical performance [Patten 2001, 2002]. The DiamondTouch table from MERL allows multiple users to interact simultaneously via touch, and has been used for applications such as a multi-user map viewer [Dietz 2001]. Other tables that are being developed at research labs within universities include the iTable from Stanford which has been used for information organization [Grant 2002], the reacTable* from the University of Pompeu Fabra which is used as a musical instrument [Jordà 2003], and the Planar Manipulator Display from NYU which has been used for simulating furniture layouts in an interior space [Rosenfeld 2003]. In the latter of these, the interactive objects are equipped with motors and their movements can be not only sensed but also controlled by the computer. Interactive tables have also been used within interactive art projects, such as the sensor table developed by Post and collaborators from the MIT Media Lab for an installation at the Museum of Modern Art in New York. The sensing surface in this case was a pixilated capacitive matrix that could detect and track bare hands through capacitive loading [Omojola 2000]. Another example is the Dialog Table which was commissioned by the Walker Art Center as a permanent installation that promotes social interactions among visitors and provides access to the museum's multidisciplinary collections [Walczak 2003].

It is worth noting here that none of the tables which use multiple object tracking have been realized in a manner that can scale beyond a research prototype or single-platform project in order to gain widespread and possibly commercial use. Nevertheless, the idea of an interactive table is gradually making its way into the consumer market, and Hitachi has announced the development of a touch-sensitive tabletop display which it plans to commercialize within the coming year, starting at a price of $20,000 US [Hitachi 2004].

Acoustic tracking is believed to be the most promising technology of determining the position of multiple objects on a media table's interactive surface. In acoustic tracking systems, objects can be located by embedding ultrasonic transmitters inside the tracked objects. Ultrasonic receivers can then be placed around the sensing area and used to pick up the short acoustic signals emitted by the objects. An object's location can be triangulated based on the time-of-flight of the signal from the transmitter to each receiver. The acoustic signal is typically transmitted through the air, which can result in errors if there are objects in the way between a transmitter and receiver. This approach has been used to locate performers on a stage [Reynolds 2001] as well as in a number of electronic whiteboard systems such as Mimio by Virtual Ink, in which an ultrasonic tracking array is positioned along the upper left edge of the board, and the acoustic signals are transmitted from special sleeves that hold the whiteboard markers. In another system from the MIT Media Lab, ultrasonic positioning has been used to track knocks or taps on large glass surfaces [Paradiso 2002, 2005]. In this case, the receivers are affixed to the back of the glass panel and the acoustic signal travels through the glass rather than through the air, which eliminates potential problems of occlusion. This method provided the inspiration for the approach used in TViews, the embodiment of the invention described below, but differs in that the TViews system places the receivers in the objects in order to allow the system to scale to larger numbers of tracked objects without sacrificing the position update rate. In the commercial realm, two companies from France, Intelligent Vibrations [Devige 2003] and Sensitive Object [Ing 1998], have both developed systems for tracking taps on large flat surfaces such as windows and tables, and their approaches are similar to the work by Paradiso described above. Intelligent Vibrations has designed an "Internet Table" with an embedded display that is designed for bars and internet cafes. Users interact by tapping on the table surface with their fingers or other objects such as pens and cutlery. Canon has developed a similar approach for tracking a vibrating stylus on the surface of a display tablet using the acoustic propagation time of the signal through a glass plate placed above the display surface [Kobayashi 1990, Yoshimura 1992].

SUMMARY OF THE INVENTION

The following summary provides a simplified introduction to some aspects of the invention as a prelude to the more detailed description that is presented later, but is not intended to define or delineate the scope of the invention.

The preferred embodiment of the invention is a media interaction platform designed for shared living spaces within the home environment. This media table, which we call "TViews," provides an extensible, multi-use platform that requires dynamic sensing and identification of an extensible set of tagged objects on the table's surface, as well as a display that is integrated into the table's surface and can provide visual output that coincides with the movements of the tagged objects.

The preferred embodiment of the invention takes the form of an interactive media table that includes a tabletop that supports a plurality of movable objects each of which is identified by a unique identification code and each of which can be moved from place to place on said tabletop surface by one or more media table users. The media table incorporates a display unit for rendering a visual image on the tabletop surface and a position tracking system for producing location data indicating the current positions of each of said movable objects.

The preferred position tracking system consists of a microcontroller coupled to at least two spaced apart transmitters that emit timed acoustic signals that traverse the tabletop surface and are detected by an acoustic signal sensor carried by each of the movable objects. The acoustic sensors on each object detect the times of arrival of the acoustic signals and transmit data indicating the arrival times via a wireless communications network to the microcontroller. The arrival time data is used to determine the travel times that elapse while acoustic signals propagate from at least two different transmitters to a particular object, these "time of flight" travel times are used to determine the distances between the particular object and the different transmitters, and the location of the particular object is then estimated by triangulation from these calculated distances.

In the preferred embodiment, an application program executing on a personal computer coupled to the tabletop display derives the displayed visual image from the location data produced by the controller. The controller preferably executes application program interface (API) routines that permits event notifications, requests and responses to be exchanged between the controller and the application program, thus allowing the media table system to be utilized as a general purpose peripheral device by a wide variety of application programs.

Each of said movable objects preferably stores an identification code that uniquely identifies that object. The API notifies a registered application program whenever a new object is placed on the tabletop surface, identifying the new object by its unique identification code. The application program may thereafter request the position of any designated object on the tabletop. One or more manual controls on each object enable the user to send signals to the application program, and visual or vibratory output devices on each device respond to notification signals from the application program by issuing visual, audible or haptic signals perceptible to the user.

The design of the sensing method and its particular implementation utilize a novel combination of sensing and communication technologies that are described in more detail below which satisfies the following requirements which should be met by an extensible architecture for media tables:

(a) Scalability of the display and interaction space in size;
  (b) Extensibility of the object identification namespace;
  (c) Portability of the interactive objects between platforms; and
  (d) Extensibility of techniques used to manage objects and applications.

BRIEF DESCRIPTION OF THE DRAWINGS

In the detailed description which follows, frequent reference will be made to the attached drawings, in which.

DETAILED DESCRIPTION

Before describing the details of the TViews design and implementation, it is useful to first provide a quick summary of the combination of technical features that have been used to fulfill these requirements.

(a) In order to allow scalability of the interaction surface in size, it is important that the object positioning technology operates independently of the size of the interactive surface. This can be accomplished using time-of-flight position detection, in which an object's position is triangulated based on the time it takes for signals to travel from a small number of fixed transmitters (i.e. at least two, and preferably three or more) to a receiver embedded in the object. The TViews table is based on acoustic time-of-flight. Since acoustic positioning does not require antenna grids or other materials covering the interactive surface, it is possible to embed a digital display in the table surface that is not obscured.

(b) In order to provide an extensible object namespace, TViews uses a unique digital identification number for each interactive object. The chosen 64-bit number allows an extremely large object namespace, but could be extended to an even larger number if necessary.

(c) Supporting portability of interactive objects from one table to another requires two things. First, a table must be able to identify any object from the entire namespace as soon as it is placed on its interaction surface. Second, any table regardless of its size needs to be able to determine the position of any object that is placed on its interaction surface. To accomplish the first goal, an enumeration strategy is used that can identify objects that are currently on a given table. For the second point, the position calculation based on triangulation of time-of-flight data needs to be done within the table rather than on the objects themselves. This way, the objects do not need to know anything about the size of the table on which they have been placed, and only need to be able to measure signal flight times and communicate those times to the table.

(d) In order to support an extensible set of applications, TViews provides an API (Application Programming Interface) that is based on an event model that sends events (messages) to client applications when objects are added to, moved on, or removed from the table. In this way, application developers are able to easily create new applications for the table platform by registering the application to receive input events from the table's control system. TViews provides an application and object manager to support multiple applications on the table and to keep track of interactive objects that are associated to the different applications.

Physical Construction Overview

Figure 1:
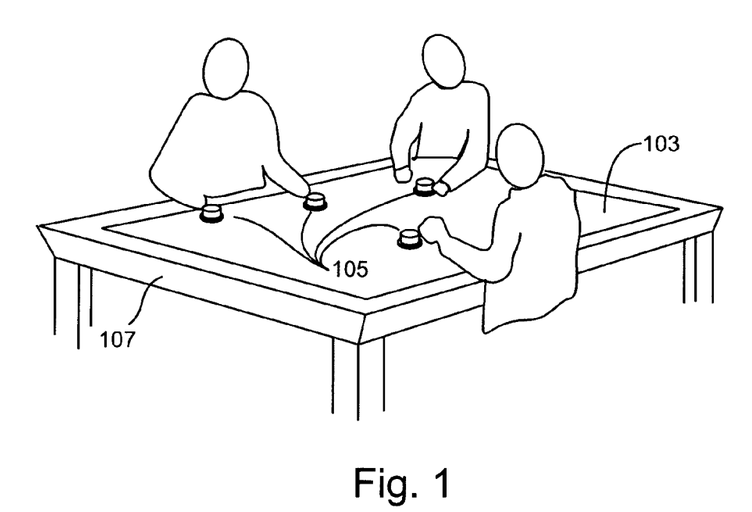
FIG. 1 is a perspective view of a media table embodying the invention.

TViews is a multi-user digital media platform with a glass surface that can locate and identify an extensible set of tagged external objects as they are swapped and moved around within its area. The tagged objects can be associated with one or more multimedia applications and act as multiple points of control for these applications, enabling shared interactions for small groups of users as shown in FIG. 1. The interaction platform includes a digital display that is integrated within the glass panel 103 and provides visual output for user's interactions with the tagged objects, four of which are seen in FIG. 1 at 105. The glass tabletop panel 103 is supported by a housing 107 which also contains a personal computer (PC) and a master control board, described below.

The process flow employed by the TViews table is summarized a follows, and details of the implementation are described thereafter.

1. Each interactive object is assigned a unique digital identification number.
2. An enumeration algorithm is used to determine objects placed on the interactive surface.
3. Physical sensing, based on acoustic time-of-flight from fixed transmitters, is used to locate the objects.
4. Identification and time-of-flight data is communicated to a system that estimates object position within the space of the interactive surface.
5. A digital display is integrated underneath the interactive surface and can be viewed from above by those using the TViews table.

Figure 2:
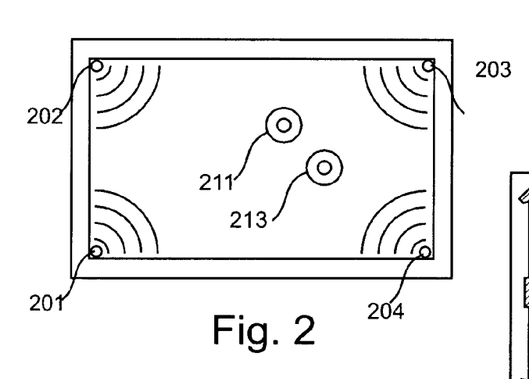
FIG. 2 is a plan view of a media tabletop showing the position of the acoustic transmitters at the tabletop corners and showing two pucks containing acoustic receivers positioned on the tabletop.
Figure 3:
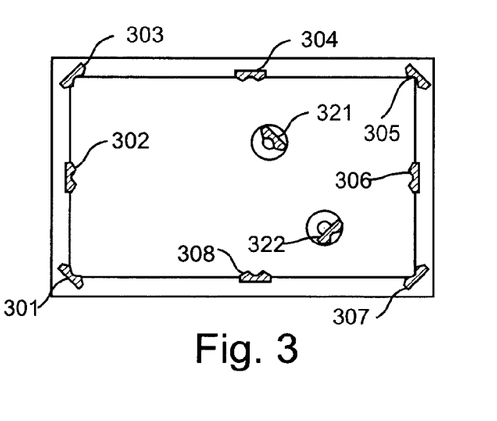
FIG. 3 is a plan view of a media tabletop showing the position of the infrared transceivers around the periphery of the tabletop and on each puck.

The position of the acoustic transmitters is shown in FIG. 2 and the position of the infrared transceivers is shown in FIG. 3. Four acoustic transmitters seen at 201, 202, 203 and 204 are affixed onto the bottom-side corners of the glass tabletop panel, and the vibrations from these four transmitters is detected by a single acoustic receiver embedded in the base of each interactive object 211 and 213. The acoustic sensors are used for locating the interactive objects (known as pucks) on the tabletop. Eight infrared transceivers 301-308 are placed around the edge of the display area above the glass plate and one infrared transceiver is placed in each interactive object as indicated at 321 and 322. The infrared sensors are used to communicate data between the table and the interactive objects placed on its surface.

Figure 4:
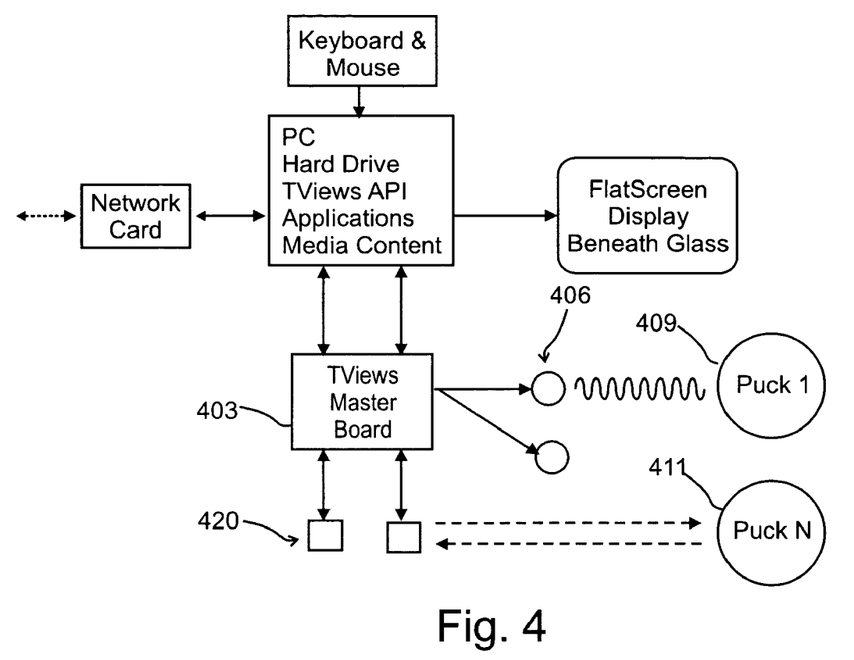
FIG. 4 is a block diagram of the media table system.

The TViews media table uses a combination of acoustic position and infrared communication technologies to implement the system's table-based object positioning architecture. A block diagram illustrating the main components of the system is seen in FIG. 4. Inside the table, a master control board 403 connected to the interaction surface manages the communication with and tracking of the large set of external objects (known as pucks) as they are placed and moved on its surface. Acoustic ranging pings generated by the four acoustic transmitters seen at 406 in FIG. 4 are used to locate the pucks seen at 409 and 411, and information between the master board 403 and pucks is communicated via infrared transceivers indicated at 420.

The acoustic transmitters 406 are implemented with piezoceramic transducers affixed to the bottom-side four corners of the glass surface to transmit the ranging pings, and a frame consisting of the eight infrared transceivers 420 is placed around the edge of the interaction surface for communication as illustrated in FIG. 3. Each puck is equipped with an ultrasonic sensor to pickup the acoustic wave traveling through the glass, as well as an infrared transceiver for data communication.

Initial Experiments

The TViews embodiment uses a time-of-flight approach to locate the tagged objects on the surface of a glass panel by sending acoustic waves through the glass from fixed transmitters to receivers located in the base of the mobile objects. Through-glass acoustic transmission was selected in order to avoid the occlusion problems that arise with through-air transmission and multiple objects on the table at once. TViews needs to track many objects on the table at the same time. For this reason, the acoustic receivers in the TViews system are placed in the base of the objects rather that affixed to the glass plate and the acoustic transmitters are affixed to the corners of the glass. This enables the TViews system to scale to larger numbers of objects on the table without a significant reduction in the refresh rate of the object positions.

Different combinations of transmitters and receivers were tested. A function generator was used to drive the transmitter with 3 cycles of a sine wave at different test frequencies. For transmitters, we selected low-cost piezoceramic disc benders and attached them to the underside of the glass tabletop panel using a cyanoacrylate adhesive (crazy or super glue). In order to determine the optimal transmission frequency, we started at 40 kHz (which is a common center frequency for many low-cost ultrasonic sensors) and tested for environmental effects. We found that by increasing the frequency well above 100 kHz, we could significantly reduce the effects of background noises, such as tapping on the glass with metal objects or jingling keys in the vicinity of the sensor. Based on these observations, we selected a frequency of 160 kHz for our initial tests.

While sound in air travels by compression and rarefaction of air molecules in the direction of travel, the molecules in solids can support vibrations in other directions. A number of different propagation modes of sound waves are thus possible in solids. The four principle types, based on the way the particles oscillate, are longitudinal waves, shear waves, surface waves and in thin materials plate waves [Auld 1990]. Longitudinal and shear waves are the two modes of propagation that are most widely used in ultrasonic testing. Longitudinal waves compress and decompress the material in the direction of motion, similar to sound in air. Shear waves vibrate particles at right angles compared to the motion of the wave. The angle at which the ultrasonic wave enters the material determines whether it will propagate via longitudinal, shear or both modes. The velocity of shear waves through a material is approximately half that of the longitudinal waves.

The phenomenon of dispersion relates to the variation of phase velocity with the frequency of a wave. Since glass is a dispersive medium, waves of different frequencies will travel through it at different velocities. We conducted experiments in order to determine the average velocity of our transmitted wave in the ¼" thick glass plate. In the first experiment, the transmitter and receiver were placed on the same side of glass. In this case, we measured an average velocity of 5529.19 m/sec for the wave at a frequency of 160 kHz. In the second experiment, the transmitter and receiver were placed on opposite sides of the glass. In this case, we measured an average velocity of 5564.36 m/sec. Our data sets yielded a percentage error of 1.28% in the first experiment and 1.53% in the second experiment. Based on these numbers, the acoustic sensing system should be able to provide an accuracy of roughly 0.5 mm if the pucks can reliably track the first peak of the acoustic signal as it travels through the glass.

Given that the results of the two experiments (transmitter/receiver on same vs. opposite sides of the glass) are roughly the same, we conclude that the measured wave is not propagating via a surface mode. The speed of sound in glass is typically within the 4000-6000 m/sec range depending on the frequency of the wave and the type of glass used. In our experiments, the ultrasonic wave entered the glass at a 90 degree angle to the surface and propagated at a velocity of roughly 5550 m/sec. Based on these two facts, we believe that the measured acoustic wave was propagating via a bulk longitudinal mode.

In the TViews system, acoustic pings are transmitted from piezoceramic disc benders placed at the four corners of the glass. When a ping is transmitted from one transmitter, the system needs to wait for any acoustic reflections in the glass to die down before transmitting a ping from the next transmitter. In order to determine an appropriate waiting time between pings, we conducted an experiment to measure the duration of the acoustic reflections. The tests showed on the order of 4-5 milliseconds of reflections. Based on these results, we determined that a delay of roughly 6 milliseconds would ensure that the reflections from one ping did not interfere with the transmission of the following one.

We tested a range of different pick-ups in order to choose a sensor that was appropriate for the TViews system. The sensor used should be sensitive enough to pick up the signal traveling through the glass without picking up too much noise from other objects placed on the table or nearby sounds. Based on our tests, we narrowed our search to the two types of sensors, which were used in the two different versions of pucks designed for the system.

The frequencies of the transmitted signal were selected to accommodate the two different types of sensors in each puck design. In the first case, we used a frequency of 160 kHz. For the second iteration of pucks, we needed to switch to a transmission frequency of 200 kHz based on the center frequency of that particular sensor. At this frequency, we measured a propagation velocity of roughly 4800 m/sec for the acoustic wave traveling through ¼" thick glass.

Figure 8:
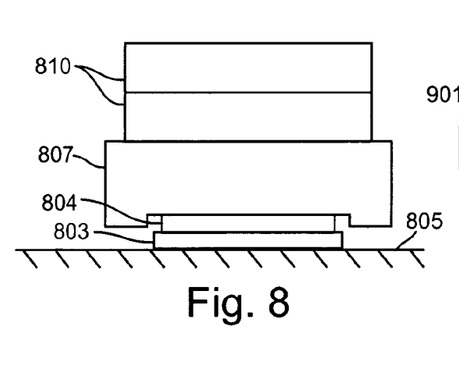
FIG. 8 is a side view of a preferred form of a weighted puck which uses a piezoelectric transducer that engages the tabletop.

The first version of pucks used piezoceramic disc benders to detect the transmitted signal, while the second used ultrasonic air transducers. In the first version, the piezoceramic disc bender was identical to the one used to transmit the acoustic signal from the four corners of the glass panel. Piezoelectric sensors convert electrical energy into mechanical and vice versa, and as such can act as both transmitters and receivers. We found that the sensor needed to be sitting flat on the surface of the glass in order to receive the signal traveling through the glass. Moreover, a certain amount of pressure needed to be applied to the sensor in order for it to make good contact. For this reason, a weighting mechanism as shown in FIG. 8 was designed to ensure that the pucks made proper contact with the glass surface. The piezoelectric disk seen at 803 is pressed against the surface of the glass panel 805 by a resilient foam layer 804 sandwiched between the piezoelectric disk 803 and plastic housing 807 that encases the puck's electronics. Brass weights seen at 810 are attached to the top of the housing 807 to hold the disk 803 in proper contact with the top surface of the glass panel 805.

We also found that these sensors performed poorly when the puck was moved around on the glass and could only reliably read the signal when they were standing still. We speculated that this was due to a slip-and-stick problem, causing them to lose contact with the glass as they were moved. For this reason, we developed a second version of the pucks using ultrasonic air transducers, specifically, model 200 KHF18 piezo transducers made by SensComp of Livonia, Mich. These have a closed face sealed construction and a center frequency of 200 kHz. The front coating (Teflon material) is intended to impedance match with air, however we found that it couples well into the glass surface as well. These transducers provide greater sensitivity allowing significantly improved pickup of the acoustic wave traveling through the glass, even when the receiver is mobile. Also, the sensor is less sensitive to lower frequency signals, which means that background noise poses less of a problem than with the piezoceramic disc benders.

While the coating used for the ultrasonic air transducer provides good matching into the glass and very little pressure is required, the sensor preferably maintains contact with the glass panel in order to best receive the signal, particularly when less expensive transducers are employed.

Based on our initial experiments with different kinds of sensors, we determined the transducer should be used with a good signal filter and amplifier housed within the puck. The design of the electronics for the TViews system is described below.

Electronics Design

The TViews system electronics include the master control board, seen at 403 in FIG. 4, which is housed within the table and the sensor tags which reside within the mobile interactive objects (also referred to as "pucks").

Figure 5:
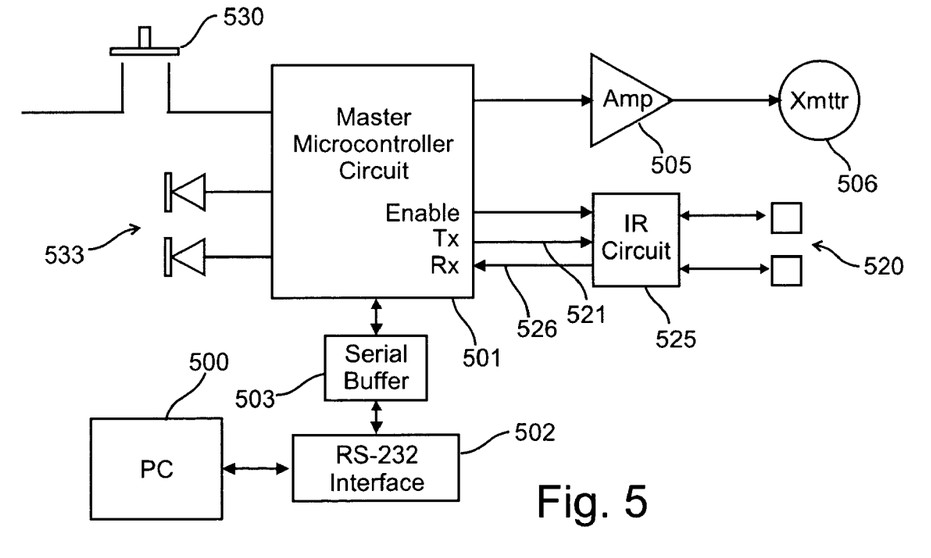
FIG. 5 is a schematic diagram of the components used to implement a master control board used by the system.

The block diagram seen in FIG. 5 shows major components of the master control board which controls the sensing and communication with the puck objects on TViews table and communicates the puck ID and position information to a communications port of a personal computer (PC) 500 using the RS-232 interface 502 and serial buffer 503 to communicate with a PIC microcontroller seen at 501, which may be implemented with a PIC 16F877A chip manufactured by Microchip Technology, Inc. of Chandler, Ariz. The serial buffer circuit uses a PIC microcontroller which may be implemented with a PIC 16F73 chip manufactured by Microchip Technology, Inc. of Chandler, Ariz.

A positioning cycle in the TViews system consists of a sequence of four pings, transmitted via each of the four piezoceramic transmitters in turn. The pulse width modulation (PWM) unit of the PIC microcontroller is used to generate three cycles of a square wave with a fundamental frequency of 200 kHz. This signal is then sent through an amplifier and filtering circuit 505. The signal is amplified to a level of around 20 V peak-to-peak. A band-pass filter is used to remove most of the harmonic frequencies, leaving only a 200 kHz sine wave at its output which is delivered to the four piezoelectric transmitting transducers 506.

Infrared was selected as the data communication method for the TViews table based on its low cost, small size, and low power requirements. An Agilent HSDL-3000 infrared transceiver, manufactured by Agilent Technologies of Palo Alto, Calif., was used in each puck and eight identical transceivers, seen at 520 in FIG. 5, are positioned round the edge of the display area as indicated in FIG. 3. The HSDL-3000 has a small form factor and low-profile, provides a shut-down feature to achieve very low power consumption, and requires a supply voltage of at least 2.7V, making it a good choice for the small battery-powered puck circuits.

Another reason for selecting infrared for data communication was based on the potential it provides for inferring the orientation of the individual pucks on the table. The master board can keep track of which infrared transceivers are being used to send and receive data to/from a given puck, and then use this information to determine roughly which direction the puck is facing.

Infrared also provides a simple way for the master board to detect when a puck has been removed from the table. As soon as the puck is removed it falls out of line-of-sight of the infrared transceivers in the table, which causes it to stop communicating. Of course, the line-of-sight requirement can also cause problems if a puck on the table is completely obscured by other objects. From our tests, we have not found this to be an issue. The eight transceivers around the edge of the table provide complete coverage and the acrylic encasing for the puck circuitry helps to reflect the infrared transmissions. As a result the infrared transmissions are unlikely to be blocked unless a puck is completely surrounded by opaque objects from all sides.

An alternate approach for data communication that does not require line-of-sight would be to use radio, such as Bluetooth transceivers. However Bluetooth typically drains up to 30 mA of current during data transfer, compared to 12 mA for the infrared transceivers that are currently used in the system. Ideally, a lower power radio solution would be needed to maximize the active lifetime of the pucks during one battery charge cycle.

An IR message is broadcast by the master board via the transmitting output port 521, the IR coupling circuitry 525 and the IR transceivers 520 notify the pucks on the table that an acoustic ping is about to be being sent from transmitter 506. The acoustic ping has a frequency of 200 kHz and an amplitude of roughly 20V peak-to-peak. Signals transmitted from the pucks are picked up by the transceivers 520 and the IR coupling circuit 525 and applied to an input port 526 of the microcontroller 501 on the TViews master board. The master control board seen in FIG. 5 is equipped with a user input button seen at 530 and status LEDs seen at 533.

The puck circuit needs to be able to detect the incoming acoustic signal that is transmitted through the glass surface. The puck circuit, seen in the block diagram of FIG. 6, processes the output from sensor 601 which, in the preferred embodiment, is the SensComp 200KHF18 ultrasonic piezo transducer described above. The puck circuit employs a PIC microcontroller 603, such as the PIC16F628A chip manufactured by Microchip Technology, Inc. of Chandler, Ariz.

Figures 6, 7:
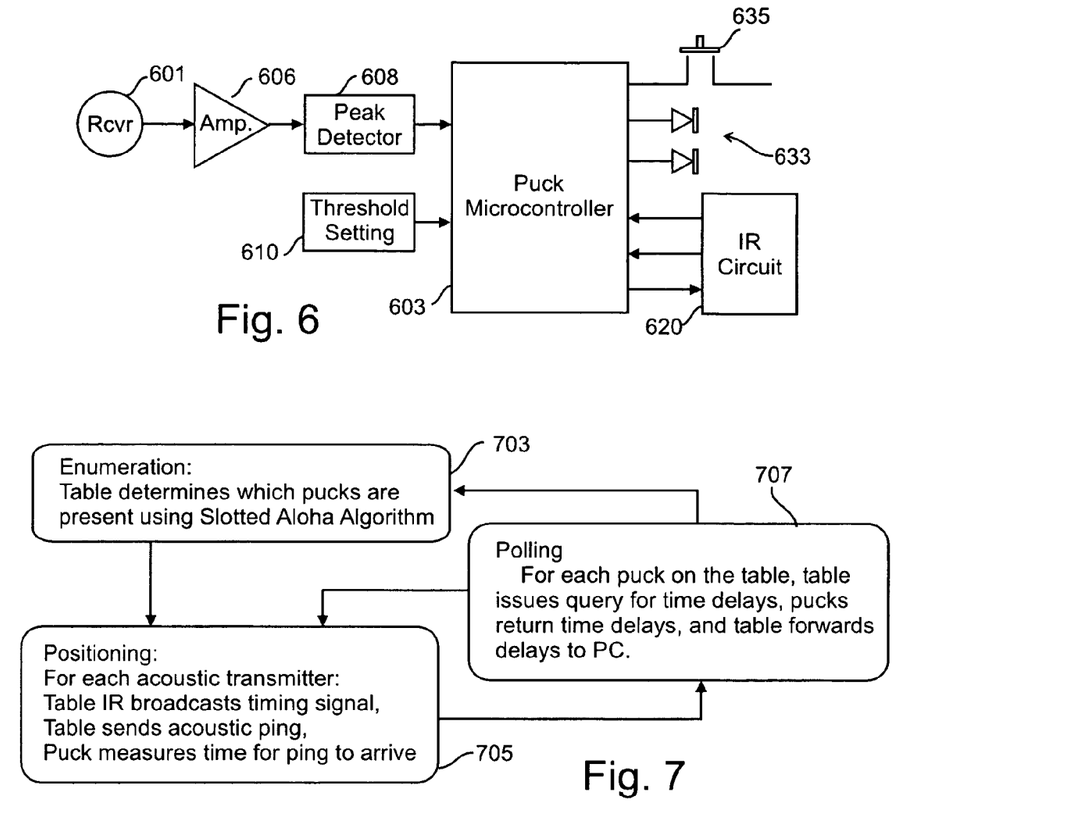
FIG. 6 is a schematic diagram of the components used to implement each puck.
FIG. 7 is a flow diagram illustrating the principle function performed to detect the presence and position of objects (pucks) on the media table.

Each puck stores its own digital ID value, which is transmitted to the master board along with the time-of-flight measurements of the acoustic pings. The signal from the acoustic sensor 601 is first amplified and filtered at 606 and then passed to a peak detector 608. The puck uses a signal thresholding approach to detect the incoming signal. The threshold can be manually tuned for each puck with a potentiometer. The threshold setting is typically around 250 mV, a value that is above the noise floor but also well below the usual amplitude of the first peak of the incoming signal. Our initial tests found that the average position error for a puck is very small (on the order of 0.5 mm) as long as the pucks can reliably track the same peak of the incoming signal at every ping cycle.

The signal from the output of the peak detector 608 of the puck circuit is applied to a threshold detector within the PIC microcontroller 603. The noise floor ranges around 150 mV, so the threshold voltage can be set around 250 mV. The peak detector 608 takes only the positive going cycles of the incoming signal.

The SensComp ultrasonic transducer 601 used in the circuit has a selective frequency response centered around 200 kHz. Nevertheless it still seems to pick up a certain amount of background noise which needs to be filtered out and then amplified. We use a first order Butterworth band-pass filter at 606, which requires only a single operational amplifier thus keeping the puck's footprint as small as possible and its power requirements as low as possible. Next, the signal is passed through a two gain stage amplifier at 606 and finally through a voltage doubling detector at 608 which keeps only the positive going cycles of the signal. The output from the peak detector 608 is then compared to the threshold voltage using an on-board comparator on the PIC microcontroller.

Battery Power

The average current drain of the puck circuit is around 12-15 mA when active (i.e. when sending/receiving infrared data). The major components on the circuit (infrared transceiver, operational amplifiers and microcontroller) were all selected to have a shut-down or sleep feature. Whenever the puck stops receiving messages from the table for more than a couple of seconds, it will go into power save mode. When asleep, the puck's the current drain drops to under 50 µA. The puck is powered by rechargeable E-Tec 90 mah lithium polymer batteries (not shown). Given the power consumption of the puck circuit, we estimate that a complete battery charge cycle will provide around 6 hours of active use.

Firmware

The firmware executed by the microcontroller 501 on the master board consists of the three main algorithmic processes illustrated in FIG. 7 that are used to enumerate and locate the pucks on the table. The system relies on the communication of data between the master board and pucks via infrared, and a special messaging format is used for control and communication purposes. The TViews firmware was implemented in the assembly language. The algorithms and message format are described below.

An overview of the software functions employed is shown in FIG. 7. Enumeration as indicated at 703 is used to determine which pucks are present on the table. This is followed by a positioning algorithm 705 and a polling algorithm 707 which are used to locate the pucks on the table. The system periodically repeats the enumeration process to rebuild the list of current pucks.

Enumeration

Each puck contains a unique digital ID, currently represented by a 64-bit number. Given this large namespace of ID values, the master control board needs to determine which particular puck IDs are on the table at any given time. Enumeration is accomplished using a variation of the Slotted Aloha algorithm described in [Abramson 1970, Roberts 1972]. When the master control board 501 initiates a round of the enumeration procedure, it asks each puck to select a random time-slot in which to send back its ID value. At the end of the round the master asks for confirmation of the ID values it has received. If no confirmation is received, it means that two or more pucks have sent their IDs in the same time slot. Collisions such as this are resolved by entering another round of enumeration until all pucks are accounted for. Once the master board has determined which pucks are present on the table, it can then determine each of their locations.

Positioning

The master board 501 controls the timing and transmission of ranging pings in sequence from each of the piezoceramic transducers 520 affixed to the glass. Before sending each ping from each of the four transmitters 506 in sequence, the master board broadcasts a message to all the pucks on the table via the IR transceivers 520 that tells them to start their internal timers. Each puck stops its timer when it detects the arrival of the acoustic signal and stores the time-of-flight measurement. At the end of the positioning round, each puck has stored four values corresponding to the time-of-flights of acoustic pings traveling from each of the four piezo transmitters.

Polling

Once the master board has identified all the pucks on the table and has transmitted a series of ranging pings, it needs to gather the time-of-flight information from each puck. In the polling procedure, the master board asks each puck in sequence to return all four of its stored time-of-flight values. The master relays this information on to an algorithm executed by the PC 500 that estimates each puck's (x,y) position within the coordinate space of the interaction surface. The time-of-flight data is relayed via the RS-232 interface seen at 540 to a program executing on the PC 500 that keeps track of puck IDs present on the table and triangulates their positions.

By off-loading the computation of position coordinates to the connected PC, it becomes possible to scale the interaction surface to different sizes and aspect ratios. As long as the PC knows the parameters of the particular interaction surface that it is connected to, it can resolve the identity and positions of any puck. In other words, pucks are portable from one platform to another regardless of size and scale. Software developers can assign meanings to the pucks within an application environment, allowing the pucks to act as controls for the digital information space. The display placed beneath the glass interaction surface acts as coincident visual output for the placement and movement of pucks on the table. The pucks may thereby be associated to different graphical or multimedia elements within the on-screen environment.

Figure 9:
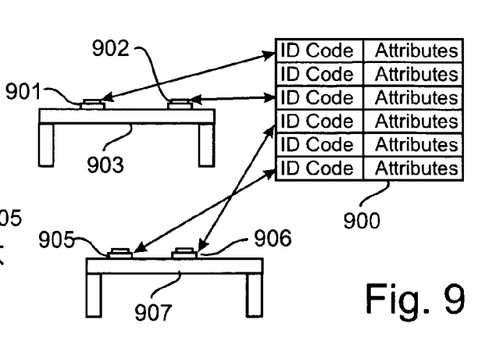
FIG. 9 is a diagram illustrating the way in which identification codes and attributes can be accessed from separate media tables via a shared data structure.

As illustrated in FIG. 9, the attributes of each movable object (puck) may be associated with its unique identification code in a stored data structure 900 that is accessible to the application program(s) that are controlled by the presence and movements of the pucks. FIG. 9 shows pucks 901 and 902 on a first media table 903 and pucks 905 and 906 on a second media table 907. Each of these pucks stores an identification code which is communicated to the application program that generates the display on each media table, and the application program then uses this code to obtain the attributes associated with the identified puck from the data structure 900, which may take the form of a table in a relational database. Importantly, a puck may be removed from one table and placed on another table, and both tables are can obtain attribute information from the data structure 900 concerning the puck.

The attribute information stored in the data structure 900 may include information about an entity represented by a given puck. The attribute data may include data which enables the application program to generate a tabletop display image which includes an image component at an image location that coincides with and tracks with the position of the identified puck as it is moved by a user on the tabletop. For example, the attribute data may define the size, shape, and color of the image component, or may be a bitmap or vector graphics image that represents the entity which is represented by the puck. In addition, the attribute data that may be stored in table 900 for a given puck may include data describing that puck's current position on a given table, allowing other application programs on other tables to generate images or other information depicting the character, position and movement of the puck. Thus, in the illustrative example seen in FIG. 9, the tables 903 and 907 may both simultaneously depict the position and movement of all four pucks 901, 902, 905 and 907. In this way, different users manipulating different pucks on different tables may create a shared experience, such as a single chess board rendered by two remotely located media boards where the player using one board manipulates the black chess pieces and the player on the other board manipulates the white chess pieces. In that example, the identification code associated with each puck would identify the stored attributes of that puck in the data structure 900 (e.g. that the puck represents a "white pawn" and giving the current coordinates of that puck on the playing surface, if it is present on the surface). If a particular puck is removed from the playing surface, this fact would be reflected in the shared attribute data 900.

The data structure 900 may be implemented in different ways. It may be stored in a shared database server which is accessible via a local area network or the Internet and contain data which can be accessed by any application using the puck's stored identification code as an access key. Alternatively, some or all of the attribute data for a particular puck may be locally stored locally and accessed by the API programs which then make the attribute data available to application programs which have registered with the API.

Message Format

TViews uses a specially developed messaging format for bidirectional data, communication between the master board 501, the pucks (via transceivers 520), and PC 500. The messages are 120 bits long and are parsed according to their operation type, an 8-bit value that follows immediately after a 16 bit header. A checksum at the end of each message verifies that the received data is accurate. The message format is designed to allow the eventual incorporation of custom message formats from external I/O devices that might be attached to the puck, such as buttons, dials or small displays. In the current implementation, a user operated button switch 635, as well as LED output displays 633, are included on each puck that can be controlled by the PC which may be located inside the TViews table. In addition to, or instead of the visual LED displays 633, each puck may be provided with a small speaker or vibratory transducer for producing audible or haptic signals; for example, when a puck is moved to particular locations on the tabletop, a message may be sent to that puck to cause it to vibrate in a particular way that can be felt by the person manipulating that puck.

Messages sent from the master control board 501 come in two forms: as broadcast messages, or as specific messages that address a single puck. The master sends broadcast messages to announce the transmission of an acoustic ranging ping, to announce the beginning of the enumeration process, and to announce the beginning of each separate enumeration round within the process. The messages sent to a single puck are specific commands for resetting its system state, polling for its time-of-flight measurements, or acknowledging its presence on the table. The master board 501 also sends a "puck removed" message to the PC if it receives no response to one of these commands, since this means the puck has been removed from the interaction surface.

A puck responds to the commands of the master board in order to transmit its ID value, return its stored time-of-flight measurements, or confirm that its presence has been acknowledged on the table. The master board 501 forwards the puck's time-of-flight measurements and ID value to the PC, where its current location is updated in software. The 64-bit ID value used to distinguish each puck could potentially also be used to classify the objects according to different kinds of data, such as the manufacturer, specific application package, or object type. Applications on the TViews table may then make use of this classification information to filter non-relevant puck IDs that happen to be placed on the table.

Position Estimation

TViews uses a real-time algorithm to determine the exact location of the pucks as they move around on the surface of the table. The time-of-flight measurements gathered from the acoustic pings are first transformed into (x,y) coordinates using a range-circles method. The computed position values are then tested against a history filter which is used to eliminate any small changes in the measurements that might make the graphical display seem shaky. Finally, a calibration routine is used to generate a transform between the table coordinates (in millimeters) and display coordinates (in pixels). The position estimation algorithm has been implemented in Java.

The first stage of the position estimation is done using an acoustic ranging method. The pucks measure the time-of-flight of the acoustic pings from each of the four transmitters located at the corners of the table. The coordinates of the four transmitters are known values for any given table, and are based on its particular size. The velocity of the transmitted signal through the glass is also a known value, and is determined by direct measurement. The distance of a puck from the four transmitters can thus be determined based on the measured time-of-flight from four range circle equations.

Transmitter i position coordinates: $(x_i, y_i)$, i=1, 2, 3 . . .
Time-delay from transmitter i to puck: $\Delta t_i$
Sound propagation velocity: $v$
Distance from puck to transmitter i: $r_i = v \times \Delta t_i$
This yields a system of four non-linear equations or "range circles" in puck coordinates (x,y):

$$(x-x_i)^2 + (y-y_i)^2 = r^2$$

where x and y are the unknown coordinates of the puck and $x_i$ and $y_i$ are the coordinates of the $i^{th}$ pinging transmitter at one corner of the glass tabletop panel. Since there four equations and only two variables, the system is over-determined. Due to errors that might arise in the time-of-flight measurements, this system is unlikely to yield a unique solution. In order to find a unique solution from this set of possible solutions, an error minimization method is employed to provide the best approximation for the (x,y) position. The well known linear least-squares method may be used to minimize the square of the distance between the solution and the measured positions. Because four measurements are taken, and only three are required for triangulation, the system may first reject any time of flight measurement that results in distances outside the space of the table. Note that the position of objects can be uniquely determined using only two transmitters if the location of the objects is known in advance to be on one side of a line joining the two transmitters; thus, for example, when two transmitters are located on two adjacent corners of a rectangular tabletop, while two circles respectively centered on the two corners having radii specified by two time of travel measurements intersect at two points, only one of the intersections will be on the table and the other can be ignored.

History Filter

As described above, a position estimation algorithm such as the linear least-squares approach is not computationally intensive and yields a reasonably accurate position estimate given reasonably accurate time-delay values. The problem arises in the cases where the measured time-delays are largely inconsistent with one another or with previous values and result in a large error in the position estimate. These errors will cause visible jumps or shakiness in the display of puck positions on the table's embedded screen.

For this reason, an additional means of filtering bad data may be employed to advantage. The current approach used by the TViews table is a simple smoothing filter which saves a small shifting history window of past position values. Outliers are rejected by taking the median value over this small window of sequential estimates. We first tried this approach using a history window of 15 position estimates, which caused a noticeable lag in a puck's position display as it was moved around the table. We then reduced the history window to 7 position estimates, and found that this resulted in a considerably smoother display of positions without noticeable lag as long as the pucks are not moving too quickly. This simple filtering method has proved sufficient; however more sophisticated data filtering methods, such as recursive filters (e.g. a Kalman filter) which can predict the state of a model in the past, present and future could be employed.

Calibration

A calibration routine has been implemented in order to determine the mapping between the table coordinates in millimeters and the display coordinates in pixels. This routine is similar to the type of calibration systems used by many touch screen devices. It asks the user to place a puck at three different points on the table surface and gathers position measurements for each one. It then computes the affine transformation matrix between the coordinate space of the measured (x,y) position, and the known display coordinate space. The calibration information is saved into a configuration file which is loaded by any application that runs on the table.

TViews API

The application programming interface (API) for the TViews platform, implemented in Java in the embodiment described, is provided by programs executing on the PC which may be housed inside the table. The API allows developers to easily create different kinds of media applications that make use of the combination of real-time object tracking and embedded display. The API software keeps track of the incoming serial messages from the master control board and parses them into three main types of events: puck ID added, puck ID removed and puck ID updated.

The API sends notifications identifying system events to any application that has been registered as a listener on the TViews platform. Each "puck ID updated" is first passed through the position estimator (described above), which converts the puck's time-of-flight measurements into (x,y) coordinates. The API can be extended to incorporate additional events to notify the application about user actions that make use of any external I/O devices that might be attached to a puck such as a button press. More specifically, The API may be extended to include support for bidirectional messaging, which allows an application to send messages to any pucks or to control specific properties. For instance, a puck might be commanded to flash to draw attention. A small display on the puck may be used to display text, graphics or video content.

Applications and Use

The description above explains structure and operation of the hardware and software used to implement the TViews embodiment. In particular, the discussion focused on the development of an acoustic-based tabletop sensing technology that is scalable to different sizes and that enables an extensible set of interactive objects to be moved from one table platform to another. The following description presents a few applications which illustrate the use of the TViews system for different purposes, such as media content organization, media browsing, game play and visual improvisation.

Picture Sorter

Managing large image collections can be a tedious and repetitive task. A collection of images can be organized by dragging images into small clusters around the surface of the TViews table, similar to the way physical photographs are sorted into piles on a tabletop.

The TViews picture sorting application explores how a tabletop platform can bring back some of the shared fun into the process of organizing digital photographs. The application makes use of the metaphor of a shoebox of images that is dumped onto a table surface for sorting. The images show up in a pile at the center of the TViews table, and the pucks are used to sort them into smaller clusters. Unlike physical photographs which can only ever be in one pile at a time, the digital nature of the application allows the same photograph to be sorted into several different clusters. For instance, different areas of the table might be graphically delineated and named, allowing digital photographs to become associated with the name of any areas into which they are dragged; if a photograph is dragged into more than one area, it acquires more than one descriptor. Users would be able to provide annotations for their photographs and the system could incorporate intelligent sorting features based on these annotations or on other image features. The image clusters could also be saved as slideshows, posted to the web for remote access, or viewed within different browsing views such as the map browser discussed next.

Map Browser

In this application the pucks are used to navigate a collection of images on a spatial map display. For example, the image collection might have been acquired during a vacation on the West Coast of Ireland. The map browser used with the TViews table organizes images on a geographic map based on the time and location at which they were taken, which may have been recorded at time of capture, or later added by the user. A timeline displayed on one side of the table is color-coded by day, and small colored dots at each location on the map indicate the days that photographs were taken there. Users attach the pucks to different days on the timeline and drag them around the map to reveal pictures taken on that day. The images appear clustered around the puck, and can be zoomed by pressing the button on top of the puck. When an image is zoomed, another puck can be used to grab hold of it and drag it to another part of the table for separate viewing.

Playing a Game: Pente

A simple Pente board game may be implemented using TViews table so that digital game-play can be performed on the tabletop platform. The game can be played with two or three players, and the goal is to place five stones in a row on the grid or to capture five pairs of an opponent's stones. Each player gets a puck which allows him or her to drop their stones onto the grid. There are three different pucks used for the game: yellow, red and blue. The yellow puck comes with a yellow icon on top, and it can place only yellow stones on the table. This aspect demonstrates how the pucks can be physically customized for a particular application, and how the physical shape of the interactive objects can be permanently linked to different meanings or functionality within the virtual space of the application. Moreover, if the red puck is moved to a different TViews table running the Pente application, it will retain its identity as a red puck in the game.

In addition to the basic game features, Pente can be played in a networked mode from two different tables at once. In this case, each player's moves show up on both tables at the same time. For instance, two players in the game might be located at one table, while the third player is located at a different physically remote table. The idea of networked tabletop game-play could eventually be extended to include many existing networked games, such as online role-playing or simulation games.

Springlets

Computers enable a variety of improvisational interactions with visual or auditory media, ranging from simple painting programs to real-time control of music or video sequences in a media performance. A tabletop display can provide a shared space for these kinds of interactions to unfold. In the Springlets application, the pucks are used to propel masses around the table that leave colorful trails behind them as they bounce around the screen.

The Springlets application is a simple example of visual improvisation on the TViews table. Two virtual spring objects (masses connected together with springs) can be controlled by the pucks, leaving colorful trails behind them as they bounce around the display area. Users latch onto the masses with a button press, and drag them around the table causing the attached displayed masses to follow behind. A second button press drops the masses, propelling them forward on their own. Once the spring objects are in motion, they dance around the table and users can engage in improvisational play as they try to trap the masses in order to control the movement and display of the colorful trails on the display area.

Application Areas

The following list of potential applications for the Media table employing the invention presented below provides a sense of the broad range of different application areas that can be explored. Media tables can be used in physical contexts ranging from home settings and classrooms to public spaces such as coffee shops or museums.

Personal or Home Management
  Information retrieval (diaries, calendars, recipes, directions, etc.)
  Management of home devices (appliances, lighting, security, media center, etc.)
  Management of portable devices (cell phones, PDAs, MP3 players, etc.)
  Messaging and remote communication
Leisure or Entertainment Activities
  Gaming (board games, learning games, simulations, networked games, etc.)
  Virtual terrariums (fish tanks, etc)
  Audio control (mixing, playlists, etc.)
  Media browsing and editing (photos, videos, audio)
Meetings and Conferences
  Data sharing and visualization (presentations, simulations, etc.)
  Video conferencing and remote connectivity
Design and Planning
  Interface design (visual layout, prototypes, etc.)
  Systems design (electrical, mechanical, etc.)
  Physical design (architecture, urban design, etc.)
Control Applications
  System control (aircraft carriers, supply chain management, etc.)
Shared Creative Activities
  Drawing, painting, music composition, etc.
Teaching Classroom Material
  History, geography, math, physics, biology, etc.
Military
  Mapping: Geographical information databases, information retrieval
  Strategic planning: Visualizing troop movements, simulated scenarios, etc.
Virtual Tours
Information kiosks in museums, etc.
Table Games
  Pool, foosball, air hockey (e.g. in coffee shops or bars)
  Gambling (e.g. casino tables)
Shared Online Access
  Chat rooms
  Networked gameplay in coffee shops, community centers, etc.

CONCLUSION

It is to be understood that the methods and apparatus which have been described above are merely illustrative applications of the principles of the invention. Numerous modifications may be made by those skilled in the area without departing from the true spirit and scope of the invention.

What is claimed is:

1. Apparatus for determining the position of a movable object in a detection region comprising, in combination:
   at least two spaced apart acoustic signal transmitters located at predetermined positions relative to said detection region each of which emits a sequence of timed acoustic signals that traverse said detection region,
   an acoustic signal sensor carried by said movable object for detecting the times of arrival of said acoustic signals at said movable object,
   a data processor located remotely from said movable object for calculating said position of said movable object from said times of arrival, and
   an output device carried by said movable object for receiving notification signals from said data processor and for rendering said notification signals in a form perceptible to a person positioned to move said movable object.

2. The apparatus for determining the position of a movable object as set forth in claim 1 wherein said detection region is adjacent a surface of a solid through which said timed acoustic signals propagate.

3. The apparatus for determining the position of a movable object as set forth in claim 2 wherein said surface of a solid is substantially horizontal and forms a tabletop supporting said object.

4. The apparatus for determining the position of a movable object as set forth in claim 3 wherein said acoustic signal sensor is carried by said object and is acoustically coupled to said surface to detect said times of arrival of said acoustic signals.

5. The apparatus for determining the position of a movable object as set forth in claim 4 wherein said processor is located remotely from said movable object and wherein said apparatus further comprises a wireless communication link for exchanging data between said movable object and said data processor, said data including data transmitted from said movable object to said processor that are indicative of said times of arrival.

6. The apparatus for determining the position of a movable object as set forth in claim 5 wherein said data further include identification data transmitted from said object to said processor that uniquely identifies said object.

7. The apparatus for determining the position of a movable object as set forth in claim 1 wherein a manually actuated control is carried by said movable object for receiving input information from a user and wherein said data include said input information transmitted from said movable object to said data processor.

8. The apparatus for determining the position of a movable object as set forth in claim 1 wherein said data further include identification information transmitted from said object to said data processor that uniquely identifies said object.

9. The apparatus for determining the position of a movable object as set forth in claim 8 wherein said data further include start-of-travel timing signals transmitted via said wireless link to said movable object to indicate the time when said acoustic signals are emitted by said acoustic signal transmitters and wherein said data transmitted from said movable object to said processor specify the time-of-flight durations which elapse between said start-of-travel timing signals and said times of arrival.

10. The apparatus for determining the position of a movable object as set forth in claim 1 wherein said wireless communication link is an infrared link.

11. The apparatus for determining the position of a movable object as set forth in claim 1 wherein said wireless communication link is a radio link.

12. The apparatus for determining the position of a movable object as set forth in claim 1 wherein said output device is a visual indicator.

13. The apparatus for determining the position of a movable object as set forth in claim 1 wherein said output device is a vibratory device for producing audible or haptic signals perceptible to said person.

14. An improvement in a media table of the type consisting of a display device integrated with a tabletop that defines a display surface that supports a plurality of movable objects that can be placed on, and moved from place to place on, said surface by one or more users, said display device producing an image that includes at least one image component that coincides with and moves with a corresponding one of said movable objects, said improvement comprising:
    a data processor,
    at least two spaced-apart acoustic transmitters, each of which responds to commands from said data processor by emitting timed acoustic signals that propagate through said tabletop to each of said movable objects,
    an acoustic signal sensor carried by each given one of said movable objects for detecting the times of arrival of said acoustic signals at said given one of said movable objects,
    a wireless communication link coupling said each of said movable objects to said data processor for transmitting data indicative of said times of arrival to said data processor,
    a program stored on a computer readable medium executable by said data processor for deriving location data from said data indicative of said times of arrival and for generating said image based on said location data.

15. The improvement as set forth in claim 14 wherein said data processor comprises:
    a controller connected to said acoustic transmitters for generating said commands and for receiving data indicating said times of arrival from said movable objects, and
    a computer coupled to said controller and that executes one or more application program for generating said image, and further executes an application program interface program the generates delivers location data indicating the position of each of said movable objects on said surface to said application program, said location data being derived from said data obtained from said controller indicating said times of arrival.

16. The improvement as set forth in claim 15 wherein each given one of said movable objects stores identification data that uniquely identifies said given one of said objects, wherein said wireless communication link communicates said identification data to said controller, and wherein said application program interface program delivers said location data and said identification data to said application program to separately indicate the position of each of said movable objects.

17. The improvement as set forth in claim 16 wherein each of said movable objects includes an input device for accepting an input signal from one of said users, wherein said input signal is communicated to said application program executing on said computer via said wireless communications link and said application program interface program.

18. The improvement as set forth in claim 16 wherein each of said movable objects includes an output device for producing an output indication perceptible to one or more of said users in response to an output command from said application program executing on said computer and transmitted to said output device via said application program interface program.

19. The improvement as set forth in claim 16 wherein said application program interface program transmits a notification message to said application program when a newly arrived object is placed on said tabletop, said notification message containing identification data stored on said newly arrived object that uniquely identifies said newly arrived object.

20. A media table comprising:
a tabletop display for rendering a visual image presented on a tabletop surface that supports a plurality of movable objects each of which is identified by a unique identification code and each of which can be moved from place to place on said tabletop surface by one or more media table users,
a position tracking system for producing location data indicating the current positions of each of said movable objects, said position tracking system comprising:
a controller,
at least two spaced apart transmitters coupled to said controller for emitting timed acoustic signals that traverse said tabletop surface to each of said objects,
an acoustic signal sensor carried by each given one of said objects for detecting the times of arrival of said acoustic signals at said given one of said objects,
a wireless communications network coupling said controller to each of said objects for receiving information indicative of said times of arrival of said acoustic signals at each of said from each of said objects, and
a position processor for deriving said location data from said information indicative of said times of arrival, and
a display processor coupled to said tabletop display and to said processor for deriving said visual image from said location data and displaying said visual image on said tabletop display.

21. The media table as set forth in claim 20 wherein said position processor first obtains data from said controller indicating the travel times that elapse while an acoustic signals propagates from at least two different ones of said transmitters to a particular object, calculates the distances between said particular object and said different transmitters from said travel times, and then derives the location of said particular object on said tabletop surface by triangulation from said distances.

22. The media table as set forth in claim 21 wherein display processor is implemented by a personal computer that executes an application program for deriving said visual image and wherein said position processor is implemented by said personal computer executing an application program interface program supplies said location data to said application program.

23. The media table as set forth in claim 22 wherein each given one of said movable objects stores identification data that uniquely identifies said given one of said objects, wherein said wireless communication network communicates said identification data to said controller, and wherein said application program interface program delivers said location data and said identification data to said application program to separately indicate the position and identity of each of said movable objects.

24. The media table as set forth in claim 23 wherein a manually actuated control is carried by each of said movable objects for receiving input information from a user, said input information being transmitted from said manually actuated control to said controller via said communications network.

25. A media table comprising:
a tabletop display for rendering a visual image presented on a tabletop display surface that supports a plurality of movable objects, each of said movable objects being identified by a unique identification code and each being movable from place to place on said tabletop display surface by one or more users,
a position tracking system for producing location data for each given one of said movable objects, said location data including the identification code identifying said given one said movable objects and further including position data indicating the current position on said display surface of said given one of said movable objects when said given one of said movable objects is placed on said display surface, and
a display processor responsive to said location data for displaying said visual image on said tabletop display surface, said visual image including visual components that appear at locations on said tabletop display surface that coincide with and track the locations of corresponding ones of said plurality of moveable objects.

26. A media table as set forth in claim 25 wherein said display processor is implemented by a computer that executes an application program for generating said visual image based on said location data and wherein said position tracking system supplies said location data to said application program via an application program interface program that executes on said computer.

27. A media table as set forth in claim 26 wherein said position tracking program transmits the identification code of said given one of said objects to said application program via said application program interface program when said given one of said movable objects is placed on said display surface.

28. A media table as set forth in claim 25 further including a database for storing attribute information which characterizes each of said plurality of movable objects and wherein said display processor employs the unique identification codes of said corresponding ones of said movable objects to retrieve said attribute information from said database to create said visual image.

29. A media table as set forth in claim 28 wherein said database is located remotely from said display processor and is accessed via a communications network connected between said database and display processor, and wherein said database contains information that is used by a plurality of different media tables.

30. A media table as set forth in claim 29 wherein said visual image includes visual image components representing movable objects which are physically located on other media tables.

* * * * *